(12) United States Patent
Duval

(10) Patent No.: US 11,580,215 B2
(45) Date of Patent: Feb. 14, 2023

(54) AUTHENTICATING SOFTWARE IMAGES

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 205 days.

(21) Appl. No.: 17/020,293

(22) Filed: Sep. 14, 2020

(65) Prior Publication Data
US 2022/0083640 A1 Mar. 17, 2022

(51) Int. Cl.
*G06F 21/00* (2013.01)
*G06F 21/44* (2013.01)
*G06F 9/4401* (2018.01)
*G06F 21/57* (2013.01)

(52) U.S. Cl.
CPC ............ *G06F 21/44* (2013.01); *G06F 9/4401* (2013.01); *G06F 21/575* (2013.01); *G06F 2221/033* (2013.01)

(58) Field of Classification Search
CPC ...... G06F 21/44; G06F 9/4401; G06F 21/575; G06F 2221/033; G06F 21/64
See application file for complete search history.

(56) References Cited

U.S. PATENT DOCUMENTS

| | | | |
|---|---|---|---|
| 8,971,538 B1 * | 3/2015 | Marr | G06F 8/65 380/285 |
| 9,230,112 B1 * | 1/2016 | Peterson | G06F 21/76 |
| 2003/0200454 A1 * | 10/2003 | Foster | G06F 21/6218 726/17 |
| 2009/0193211 A1 * | 7/2009 | Hu | G06F 21/575 711/E12.001 |
| 2011/0254687 A1 * | 10/2011 | Arponen | H04W 12/126 726/34 |
| 2019/0018669 A1 * | 1/2019 | Cook | G06F 9/4401 |
| 2019/0243635 A1 * | 8/2019 | Van Sickle | G06F 8/654 |
| 2021/0209231 A1 * | 7/2021 | Weigand | G06F 21/64 |

OTHER PUBLICATIONS

Su et al., "Learning to Hash for Personalized Image Authentication", IEEE Transactions on Circuits and Systems for Video Technology, vol. 31, Issue: 4, Apr. 2020.*

* cited by examiner

*Primary Examiner* — Morshed Mehedi
(74) *Attorney, Agent, or Firm* — Holland & Hart LLP

(57) ABSTRACT

Methods, systems, and devices for authenticating software images are described. A system may include one or more control units that use software images for managing different functions of the system. The system may also include a secure storage device configured to validate or authenticate the software images used by the different control units of the system. A software image of a control unit may be authenticated by generating a first hash associated with a portion of its underlying source code and generating a second hash associated with a corresponding portion of the source code of the copy of the software image stored to the secure storage device. Different patterns of the source code of the software images may be used to generate the hashes. The first hash and second hash may be compared, and the software image may be authenticated based on the hashes matching.

22 Claims, 6 Drawing Sheets

AUTHENTICATING SOFTWARE IMAGES

BACKGROUND

The following relates generally to one or more systems for memory and more specifically to authenticating software images.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
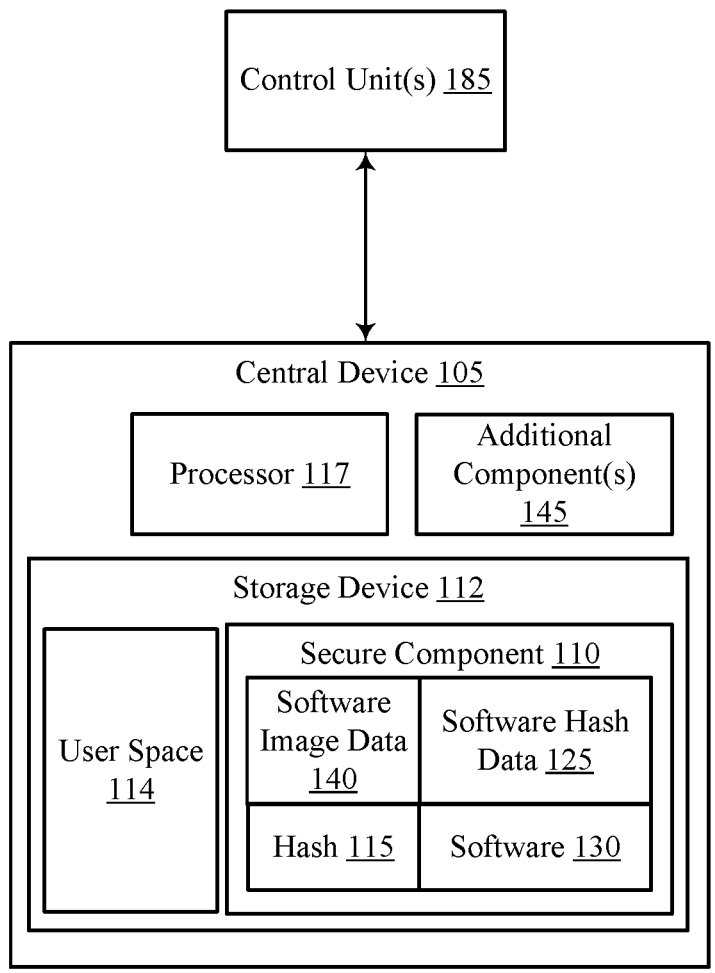
FIG. 1 illustrates an example of a system that supports authenticating software images in accordance with examples as disclosed herein.

Some computing systems may include one or more control units for managing various aspects of the system. For example, an automotive system may include one or more control units associated with various components and operations of a vehicle. A control unit may be an embedded system that controls one or more electrical systems or subsystems of the system. Examples of control units of a vehicle may include a power train control unit, a human-machine interface control unit, a door control unit, different types of engine control units, seat control unit, speed control unit, telematic control unit, transmission control unit, brake control unit, battery management control unit, or others, or a combination thereof. The control units may store respective software images that, when executed, cause the system (and its associated components) to operate in an intended manner. In some systems, different control units may implement different authentication procedures. Because some authentication procedures may be more secure than others, weaknesses in some control units may allow for hackers to gain unpermitted access to the respective control unit. Moreover, relatively unsecure authentication procedures for any one control unit may place other control units and/or the entire computing system at risk for malicious attacks. Accordingly, it may be beneficial to authenticate the software images of control units to prevent malicious actors from altering or gaining control of one or more aspects of a computing system.

Techniques are described herein for authenticating software images of control units. The control units of a system may be accessed by a computing unit (e.g., a central computing unit) that may include a secure storage device. The secure storage device may be configured to validate or authenticate the software images of the other control units of the system. The secure storage device may include storage (e.g., a portion of its storage) that is inaccessible to an outside device (e.g., a host device). The secure storage device may store copies of the software images stored to each control unit of the system or hashes of the software images. The stored information may represent the intended state (e.g., an unaltered state) of the software images of the control units, and may be used to authenticate the software images of the control units. By using information associated with the intended state (e.g., the unaltered state) of the software images during an authentication process, the secure storage device may be able to determine whether any software images stored to the various control units was altered or subject to a malicious attack.

To authenticate a software image of a control unit, the secure storage device may read (e.g., measure) a portion of the source code of the software image saved to the control unit. In some examples, the portion of the source code of the software image may be read during a boot sequence of the associated computing system or a boot sequence associated with the control unit or both. The portion of the source code may be less than the entire source code of the software image, and may be used to generate a first hash (e.g., a first cryptographic hash).

The first hash may be compared with a second hash that is generated using the source code of the corresponding copy of the software image stored to the secure storage device. For example, the secure storage device may read a portion of the source code of software image stored to the control unit and generate a first hash, and may read a corresponding portion of the source code of the copy of the software image stored to the secure storage device and generate a second hash. The hashes may be compared and, based on the hashes matching, the software image of the control unit may be authenticated. When the software image of the control unit is authenticated, the software image may be executed and the control unit may boot. However, if the software image of the control unit is not authenticated, the control unit may be prevented from booting and other security measures may be implemented. Authenticating software images of control units as described herein may increase the overall security and reliability of the associated computing system. For example, centralizing authentication of the different control units with the secure storage device may improve the security of the control units and decrease a probability that any given control unit or the system more general is compromised by an unauthorized user.

Features of the disclosure are initially described in the context of systems as described with reference to FIGS. 1 and 2. Features of the disclosure are described in the context of block diagrams and process flow diagrams with reference to FIGS. 3 and 4. These and other features of the disclosure are further illustrated by and described with reference to an apparatus diagram and a flowchart that relate to authenticating software images as described with reference to FIGS. 5 and 6.

FIG. 1 illustrates an example of a system 100 that supports authenticating software images in accordance with examples as disclosed herein. The system 100 may include a central device 105 and one or more control units 185. The control unit(s) 185 may be an example of an infotainment system of a vehicle, a telematics system of a vehicle, a powertrain system of a vehicle, a speed control system of a vehicle, or the like.

The central device 105 may include a processor 117, a storage device 112, and one or more additional components 145. The storage device may include user space 114 that is configured to store data (e.g., general purpose data). The storage device 112 may also include a secure component 110 that is configured to securely store at least software image data 140, and software hash data 125. In some cases, the secure component 110 may store additional software 130.

In some examples, the storage device 112 may store one or more keys, such as a management key and/or an identity key. The key may be an example of a symmetric server root key (SRK) or a set of two keys such as a management public key and a device-side identity private key. The server root key or management public key may allow an entity in possession of a copy of the SRK or the management private key to manage the secure component 110 by turning on or configuring security features of the secure component 110. The storage device 112 may include one or more components associated with a memory device that are operable to perform one or more authentication procedures as discussed herein.

The storage device 112 can be integrated into a central device 105, which may include a processor 117 interacting with the storage device 112. The processor 117 may load one or more software images on the control unit(s) 185 and may communicate with the control unit(s) 185 to receive software images (e.g., portions of software images) during an authentication process. Prior to running a software image on a control unit 185, the storage device 112 may authenticate the software image to ensure that it has not been tampered with, and elect not to run the software image if its code has been modified by a malicious actor.

In some examples, the storage device 112 may include copies of one or more software images that are stored at the control unit(s) 185. The copies of the software images may be stored at the software image data 140 portion of the secure component 110. Before the software images may run (e.g., before booting the software images), the image(s) may be authenticated to ensure that the underlying code has not been unintentionally altered.

Techniques for authenticating software images of the control unit(s) 185 are described herein. During a first portion of authenticating the image(s), the control unit(s) 185 or any entity in possession of the software image to be authenticated can transmit a portion of the software image to the secure component 110. The secure component 110 may calculate a hash of the portion of the software image and may store the hash to the hash 115 portion of the secure component 110. In some examples, as described herein, the calculated hash may not be stored to the secure component 110 during the authentication process.

As described herein, the secure component 110 may store copies of software images run by the control unit(s) 185 or may store hashes of authenticated versions of the software images run by the control unit(s) 185 (e.g., a golden hashes). To authenticate a software images of a control unit 185, the secure component 110 may generate a hash of the software image to be used by the control unit. The secure component 110 may identify a hash stored in its memory or hash a same portion of the copy of the software image stored by the secure component 110 (e.g., identify or generate golden hashes). To authenticate the software image, the calculated and golden hashes may be compared and, if the hashes match, the control unit 185 may run the program associated with the software image. Authenticating software images of control units as described herein may increase the overall security and reliability of the associated computing system.

Figure 2:
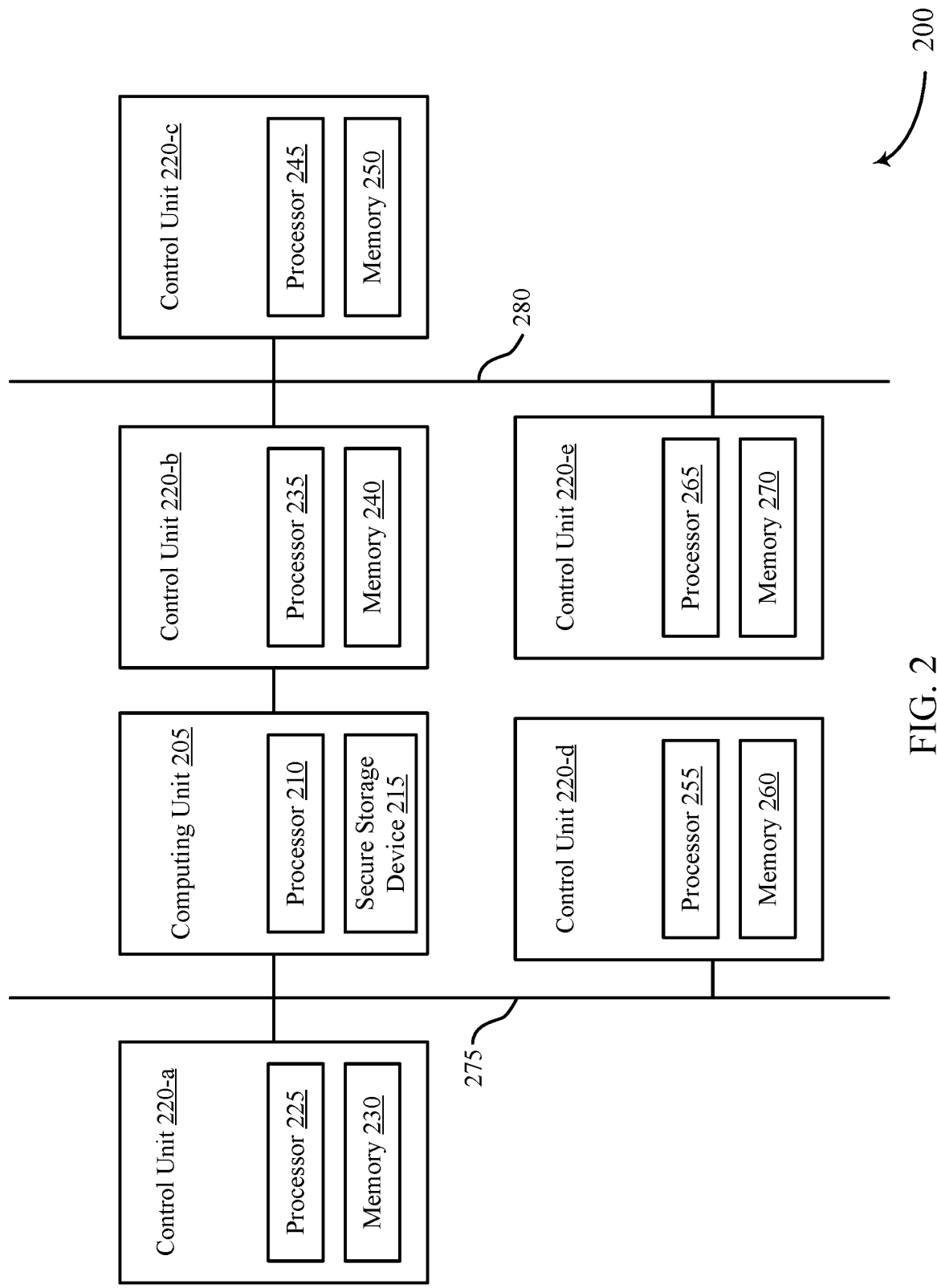
FIG. 2 illustrates an example of a system that supports authenticating software images in accordance with examples as disclosed herein.

FIG. 2 illustrates an example of a system 200 that supports authenticating software images in accordance with examples as disclosed herein. In some examples, the system 200 may be an example of an automotive system. The system 200 may include a computing unit 205 that includes a processor 210 and a secure storage device 215. The computing unit 205 may be coupled with one or more control units 220 via a bus 275 and/or a bus 280. Each of the computing units 205 may run different programs for controlling different portions of the system 200 (e.g., different portions of an automobile). The computing units 205 may each include a respective processor and memory device. The respective memory devices of the computing units 205 may store code (e.g., programs, software images) associated with the respective programs. The stored code may be authenticated using the methods described herein, which may increase the overall security and reliability of the system 200.

The system 200 may include multiple control units 220 which may be examples of or may be referred to as electronic control units (ECUs) 225. Each computing unit 225 may be associated with a different function of the system 200. For example, in an automotive application, each computing unit 225 may be associated with a different vehicle system. For example, the control unit 220-a may be associated with vehicle telematics, the control unit 220-c may be associated with vehicle powertrain, the control unit 220-d may be associated with vehicle powertrain, and the control unit 220-e may be associated with vehicle speed control. In some examples, the control unit 220-b may be an example of a gateway control unit, which may allow the control unit 220-c and the control unit 220-e to communicate with the computing unit 205. The control unit 220-a and the control unit 220-d may communicate with the computing unit 205 via the bus 275. A control unit 220 may be an embedded system that controls one or more electrical systems or subsystems of the system 200. Examples of control units 220 of a vehicle may include a power train control unit, a human-machine interface control unit, a door control unit, different types of engine control units, seat control unit, speed control unit, telematic control unit, transmission control unit, brake control unit, battery management control unit, or others, or a combination thereof.

Each computing unit 225 may be configured to run one or more programs (e.g., software programs) associated with its respective function. The source code of the respective programs may be stored in a software image saved to the memory of each control unit 220 and may be executed by a respective processor. For example, a software image associated with the telematics of a vehicle may be stored to the memory 230 of the control unit 220-*a*, and the processor 210 may execute the software image to run the program. The memory 230 may include non-volatile memory such as flash memory (e.g., not-and (NAND) memory). In some examples, each of the control units 220 may include non-volatile memory and may include a respective processor configured to execute a software image stored to the respective memory.

The computing unit 205 (e.g., the central computing unit 205) may be configured to manage each of the control units 220. For example, the computing unit 205 may communicate with each of the control units 220 (e.g., via the bus 275, the bus 280, and/or the control unit 220-*b*) to execute and/or authenticate respective software images. The computing unit 205 may include a secure storage device 215, which may include non-volatile memory such as flash memory (e.g., NAND memory). The secure storage device 215 may be configured to store a copy of the software image of each control unit 220 (e.g., a copy of the code stored to each control unit 220). The copies of the software images stored to the secure storage device 215 may be used for authenticating the software images stored to each control unit 220, and may be stored to the secure storage device 215 during an initialization of the system 200. For example, in an automotive context, the copies of the software images may be stored to the secure storage device 215 during a manufacturing process of a vehicle.

By storing a copy of each software image to the secure storage device 215 or by storing hashes of authenticated versions of each software image, the computing unit 205 may authenticate the software images stored to each control unit 220. Because a system 200 may include multiple control units 220 storing respective software images, each control unit may be susceptible to an independent malicious attack. By storing copies of each of the software images to the secure storage device 215 or copies of the hashes of authenticated versions of each software image, the computing unit 205 may be able to authenticate each of the control units 220 thus increasing the overall security of the system 200. For example, the secure storage device 215 may be configured to authenticate the software images of each control unit 220 upon a boot sequence of the computing system. Thus before the control units 220 execute a respective software image, the software image may be authenticated to ensure that it was not subject to a malicious attack. Additional details of the authentication process may be described below with reference to FIGS. 3 and 4.

Figure 3:
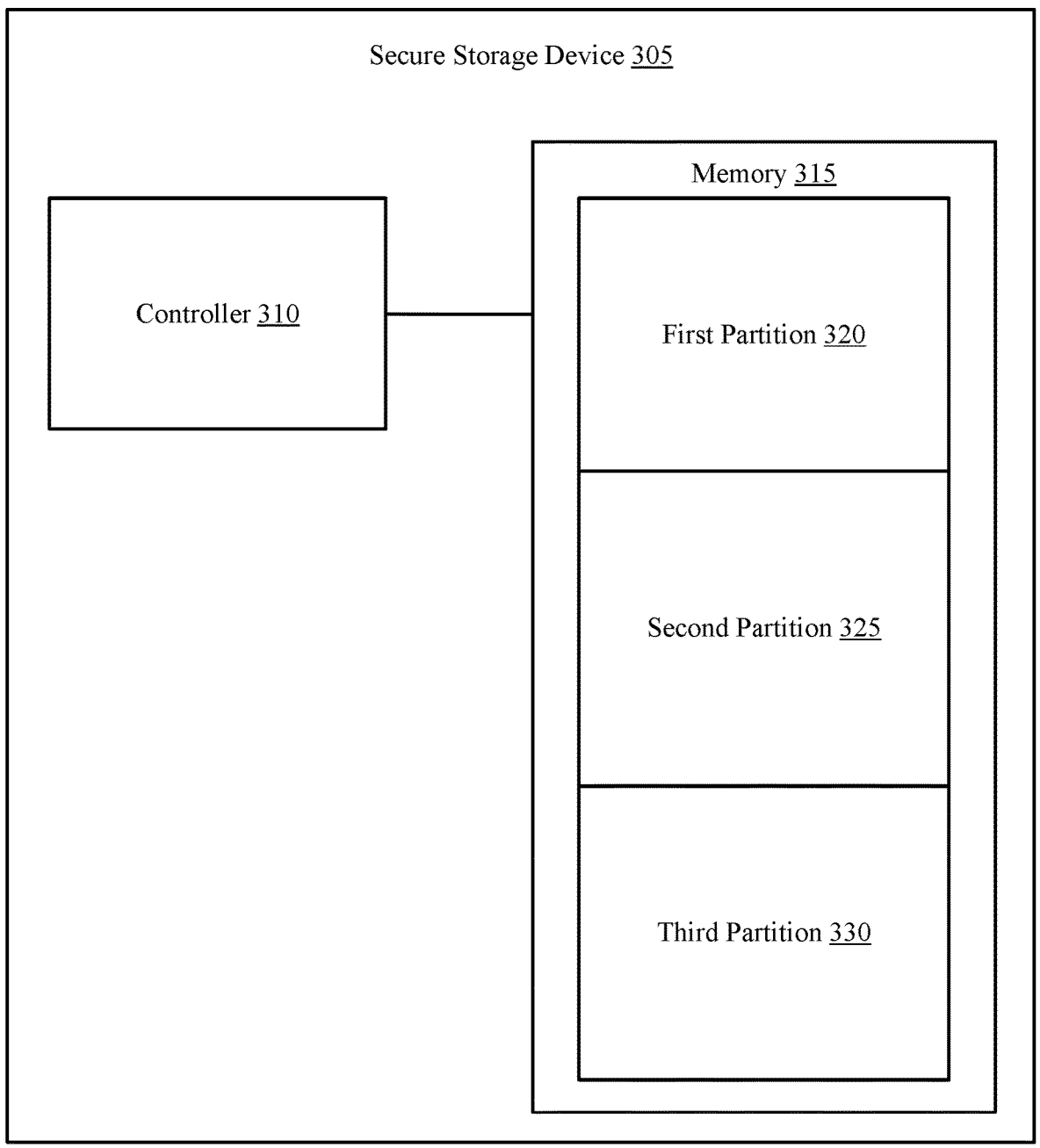
FIG. 3 illustrates an example of a memory device that supports authenticating software images in accordance with examples as disclosed herein.

FIG. 3 illustrates an example of a memory device 300 in accordance with examples as disclosed herein. In some examples, the memory device 300 may be or may include a secure storage device 305, which may be an example of a secure storage device 215 as described with reference to FIG. 2. The secure storage device 305 may include a controller 310 that is coupled with memory 315. The memory 315 may include non-volatile memory, such as flash memory. The secure storage device 305 may be located within a computing unit, such as the computing unit 205 as described with reference to FIG. 2. In some examples, the secure storage device 305 may store copies of software images of various control units, such as the control units 220 as described with reference to FIG. 2. The stored copies of the code may be used for authenticating software images stored to the control units using the methods described herein, which may increase the overall security and reliability of the associated computing system.

The secure storage device 305 may include a controller 310, which may be configured to authenticate software images associated with control units (e.g., control units 225 as described with reference to FIG. 2) of a computing system. In some examples, the controller 310 may be configured to communicate with various control units to obtain (e.g., measure, sample) portions of respective software images for authentication. For example, the controller 310 may obtain portions of the source code of respective control units and generate hashes associated with the respective portions of the source code. The generated hashes may be compared with hashes (e.g., golden hashes) stored to the memory 315 during an authentication process.

The memory 315 may be coupled with the controller 310 and may include one or more partitions. The memory 315, which may include non-volatile memory, may include a first partition 320, a second partition 325, and a third partition 330. In other examples (not shown), the memory 315 may include N partitions, where N is an integer (e.g., a positive integer). As shown in FIG. 3, the first partition 320 may be configured to store one or more tables for use in authenticating the software images of the control units. The first partition 320 may be secure such that it is accessible only by the controller 310. The second partition 325 may be configured to store copies of the software images of each control unit and may be secure such that it is accessible only by the controller 310 or to store the hashes of authenticated versions of the software images of each control unit. The stored copies may be used for calculating hashes (e.g., golden hashes) and/or restoring a software image of a control unit (e.g., a control unit 220 as described with reference to FIG. 2). In some examples, the first partition 320 and the second partition 325 may be a single partition.

Additionally or alternatively, the third partition 330 may represent user space for general storage, and may be accessible to components other than the controller 310. That is, the third partition 330 may not be secured in the same manner than the first partition 320 and the second partition 325 are secured. In some examples, it may be desirable to maximize the size of the third partition 330. Thus, the size of the memory may be a matter of design choice, though may be large enough to store a copy of the software image of each control unit and maximize the amount of available user space.

To authenticate software images of the control units of an associated computing system, copies of each software image may be stored to a secure portion of the memory 315 (e.g., to the second partition 325). In some examples, the copies of the software images may be stored during manufacturing of an associated computing system, and may be stored by the controller 310 or other device that has permission to access a secure portion of the memory 315 (e.g., the second partition 325). The copies of the software images may represent the intended version of the source code of a software image (e.g., an unaltered version of the source code).

In some examples, the controller 310 may be configured to generate one or more hashes (e.g., golden hashes) associated with each copy of a software image stored to the second partition 325. The hashes may be calculated by sampling (e.g., measuring) patterns of the source code of each software image. The patterns may represent subsets of the complete source code, and may be determined based on various operating characteristics of the associated computing system and/or prior assessments of known malicious attacks. For example, the patterns may be selected based on read speeds, read sizes, bus speeds, a maximum quantity of patterns for any one control unit, or other characteristics or known information. The patterns may be stored to a table (e.g., a first table) stored to the first partition 320.

The first table, which may be referred to as a control unit patterns table, may store various pattern identifications (IDs) and associated sampling patterns. For example, each pattern ID may be associated with a respective portion of the source code of a software image to measure during an authentication operation. The respective portion may identify a starting address and a size of code to sample. Table 1, as reproduced below, may illustrate an example control unit patterns table.

TABLE 1

| Pattern ID | Sampling Pattern |
| --- | --- |
| 1.1 | (Starting Address, Size), (Starting Address, Size), . . . |
| 1.2 | (Starting Address, Size), (Starting Address, Size), . . . |
| . . . | . . . |
| 2.1 | (Starting Address, Size), (Starting Address, Size), . . . |
| 2.2 | (Starting Address, Size), (Starting Address, Size), . . . |
| 2.3 | (Starting Address, Size), (Starting Address, Size), . . . |
| . . . | . . . |

In other examples (not shown), the control unit patterns table may include any quantity of pattern IDs, and each pattern ID may include any quantity of patterns to sample. Additionally or alternatively, the control unit patterns table may store information relating to an estimated size of the source code that a respective pattern ID may sample (e.g., a percentage of the full source code), an estimated time to measure the pattern of code, and/or a score indicating the effectiveness of using the respective pattern ID in an authentication operation.

A sampling pattern may be used to generate hashes (whether hashes of the software image being run by the control unit or hashes of the authenticated versions of the software image). A sampling pattern may enable the secure storage device to load less information than the entire software image, which can decrease the time spent to authenticate the various control units. During an authentication operation, both hashes used should be associated with the same sampling pattern. If different sampling patterns of the software image are used to generate the hashes, the hashes will likely not match. Additionally, using multiple sampling patterns may allow the secure storage device to store hashes or multiple versions of code of the same software image, which may improve the security performance of the authentication operation. For example, if a hash associated with a first sampling pattern fails to identify a modification introduced by a malicious actor, other hashes associated with other sampling patterns may be used to detect modifications and correctly result in an authentication failure result.

In some examples, a second table (e.g., a pattern sequences table) may be used in conjunction with the control unit patterns table to authenticate software images of control units. For example, the second table may be used when generating hashes (e.g., golden hashes) associated with the copies of the software images stored to the second partition 325, and to determining which patterns of the software images of each control unit to measure. Each entry in the second table may be associated with a sequence number and one or more pattern IDs. A sequence may correlate to a software image of a control unit and the pattern IDs may correspond to indexes of sampling patterns used by secure storage device to generate golden hashes or portions of software images stored by the secure storage device. In case the golden hashes are statically generated, the table may include the hash for the entire sampling sequence or one hash per element of the list of pattern IDs. Table 2, as reproduced below, may illustrate an example pattern sequences table.

TABLE 2

| Sequence ID | List of Pattern IDs | Static Golden Hash(es) |
| --- | --- | --- |
| 1 | 1.1, 2.3, 3.6, . . . | 0x12a93042 . . . |
| 2 | 1.2, 2.3, 3.4, . . . | 0xffa12090999 . . . |
| 3 | 1.1, 2.6, 3.12, . . . | 0x12345634533 . . . |
| 4 | 1.4, 2.7, 3.2, . . . | 0xabcde123123 . . . |
| 5 | 1.5, 2.5, 3.1, . . . | 0x90012412a90 . . . |
| 6 | 1.7, 2.2, 3.5, . . . | 0x123012940abf3 . . . |
| . . . | . . . | . . . |

When generating hashes (e.g., golden hashes) associated with the copies of the software images stored to the second partition 325 (e.g., authenticated versions of the sampled software images), the controller 310 may measure the code of each software image using the pattern IDs of the pattern sequences table and associated sampling patterns of the control unit patterns table. For example, a first hash for each software image may be generated using the sampling patterns (from Table 1) associated with pattern IDs 1.1, 2.3, and 3.6 that are associated with sequence 1 in Table 2. To further the example, a second hash for each software image may be generated using the sampling patterns (from Table 1) associated with pattern IDs 1.2, 2.3, and 3.4 that are associated with sequence 2 in Table 2. The measured data for each software image may be hashed and may be stored to the memory 315. In some examples, the generated hashes (e.g., the golden hashes) may be stored as entries in the pattern sequences table (not shown). In other examples, the hashes may be stored to a secure portion of the memory 315 (e.g., to the first partition 320 or the second partition 325). As described herein, the second partition 325 may store copies of software images that may be used for calculating hashes (e.g., golden hashes) and/or restoring a software image of a control unit (e.g., a control unit 220 as described with reference to FIG. 2).

In some examples, the golden hashes may be generated each time the associated computing system is booted, which may be referred to as dynamically generating the hashes. In other examples, the golden hashes may be generated a single time, which may be referred to as statically generating the hashes. For example, the hashes may be generated upon manufacturing the secure storage device 305 and/or upon installing a software update on one or more control units. While dynamically generating the hashes may provide some extra security measures relative to statically generating the hashes, statically generating the hashes may reduce the overall boot time of the associated computing system which may be desirable.

The hashes stored in the memory 315 (e.g., the golden hashes) can be used to authenticate the software images of various control units of the computing system. To authenticate the software images of the control units, the controller 310 may select a random integer corresponding to the sequence column in the pattern sequences table. For example, if the controller 310 randomly selects two (2), then the entry associated with sequence 2 may be used to measure the software image of the source code of each control unit. Using the same example, the source code of each control unit that is associated with the sampling patterns of pattern IDs 1.2, 2.3, and 3.4 may be measured and hashed. The hashes generated by measuring the source code of each control unit may be compared with the hashes stored to the memory 315 (e.g., the golden hashes) to authenticate the software images of the control units.

If a respective software image of a control unit is authenticated (e.g., if the compared hashes match), the software image may be executed and the program may boot as intended. However, if a software image is not authenticated (e.g., if the compared hashes do not match) then the software image may have been subject to a malicious attack. In situations where a software image is not authenticated, the controller 310 may delay booting of the associated computing system and identify the faulty control unit by enabling a flag associated with the faulty control unit (e.g., raising a flag associated with the faulty control unit). For example, in an automotive application, the controller 310 may delay starting the automobile and may identify the faulty control unit as needing repair. In some examples, the state of the flag may remain across power cycles, forcing a full authentication sequence rather than a sampled sequence until the source code is known to be restored to its intended state in every ECU.

In some examples, a flag for a control unit may be enabled during the boot sequence. If the flag is enabled, the controller 310 may measure and hash the entire source code of the software image of the control unit, as opposed to measuring and hashing only a portion. The complete hash (e.g., the complete first hash) may be compared with a golden hash stored to the memory 315 and associated with the entire source code of the correct software image. Additionally or alternatively, if a single flag of a control unit is enabled during the boot sequence, the controller 310 may measure and hash the entire source code of the software image of each control unit of the system. The complete first hashes may be compared with complete hashes generated by hashing the source code of each of the copies of the software images stored to the memory 315.

Upon identifying the faulty control unit, the controller 310 may be configured to download the valid source code to the faulty control unit from the memory 315 (e.g., from the second partition 325), if the copy of the source code is available in the second partition 325. Additionally or alternatively, upon detecting a faulty control unit, the controller 310 may be configured to prevent the computing system (e.g., the automobile) from starting, display an error on one or more displays associated with the computing system, and/or boot the computing system in a safe mode by refraining from booting the faulty control unit(s). Authenticating software images of control units as described herein may increase the overall security and reliability of the associated computing system.

Figure 4:
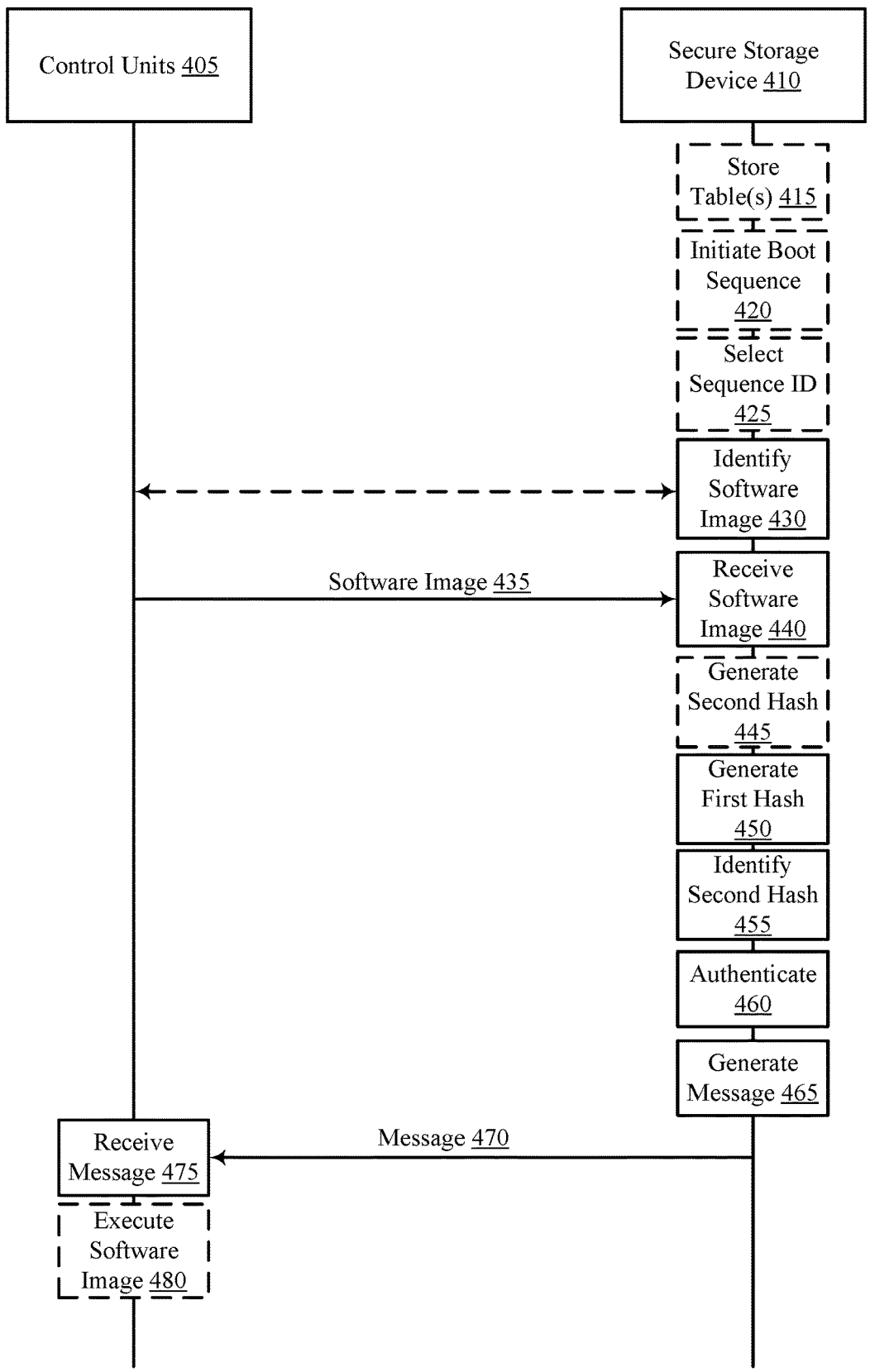
FIG. 4 illustrates an example of a process flow diagram that supports authenticating software images in accordance with examples as disclosed herein.

FIG. 4 illustrates an example process flow diagram 400 that supports authenticating software images in accordance with examples as disclosed herein. The process flow diagram 400 may illustrate the operation of one or more components of the system 200 as described with reference to FIG. 2 and the secure storage device 305 as described with reference to FIG. 3. For example, the process flow diagram 400 may illustrate a secure storage device 305 authenticating a software image of a control unit 220 as described with reference to FIGS. 2 and 3, respectively. The process flow diagram 400 may illustrate the operations of a control units 405 and a secure storage device 410.

A secure storage device may be configured to authenticate software images of one or more control units of a computing system. The secure storage device may store golden hashes generated from intended versions of the software images of the control units of the computing system. The stored golden hashes may enable the secure storage device to determine whether the software image of the control units has been altered.

To authenticate the software images, the secure storage device may be configured to measure a portion of the source code of a software image saved to a control unit. As described with reference to FIG. 3, the secure storage device may determine a portion of the source code to measure based on entries in a control unit patterns table and/or a pattern sequences table. The secure storage device may measure the portion of the source code of each control unit and generate a corresponding hash (e.g., a corresponding cryptographic hash). The generated hash may be compared with a hash stored to the secure storage device and associated with a stored copy of the source code. Based on a comparison of the hashes, the secure storage device may determine whether the software image of any control unit has been modified.

In some examples, the host control units 405 may include a software image to be authenticated (e.g., during a boot sequence). The software image may be or may include an operating system, a software program, or the like. Because control units may be susceptible to hacking, where one or more aspects of code of the software image are altered, it may be beneficial to authenticate the software image before the control units 405 complete an associated boot sequence. If the code has been altered, and the control units 405 may be prevented from booting and/or a correct version of the software image may be loaded to the control units 405 (e.g., from the secure storage device 410). In other examples, the program associated with the software image may be prevented from running so that additional damage done by the hacking does not occur. Authenticating software images of control units as described herein may increase the overall security and reliability of the associated computing system.

At 415, one or more tables for use in authenticating a software image of the control units 405 may be generated (e.g., by a remote computing device) and stored to the secure storage device 410. For example, the tables may be generated by a remote computer knowing the intended version of the software images for each of the control units 405. The remote computer may store the tables to the secure storage device 410 during a system installation phase and/or during further maintenance or software update operations. For example, as described with reference to FIG. 3, the remote computing device may generate a control unit patterns table and/or a pattern sequences table. The pattern sequences table may be used for identifying the pattern IDs to use in measuring the source code of the software image of the control units 405. The control unit patterns table may be used for identifying sampling patterns of the code based on the pattern IDs. In some examples (not shown), the tables may be constructed at a different portion of the authentication process. For example, when statically generating hashes (e.g., golden hashes) the tables and associated hashes may be generated prior to initiating the boot sequence (e.g., prior to 420). In other examples, when dynamically generating hashes (e.g., golden hashes), one or more portions of the tables may be generated after receiving a portion of a software image from the control units 405 (e.g., during or after 435).

At 420, a boot sequence may optionally be initiated at the secure storage device 410. A boot sequence may be initiated when the secure storage device 410 is powered on or when a control units 405 associated with the secure storage device 410 is activated, for example when an automobile is started (e.g., powered on). In some examples, the control units 405 may be booted after a software image associated with the control units 405 is authenticated.

At 425, the secure storage device 410 may optionally select a sequence ID corresponding to a row in the pattern sequences table. The integer may identify pattern IDs for measuring the source code of the software image of the control units 405. Because the pattern IDs may indicate which portions of the code to measure (e.g., using the control unit patterns table), the selected integer value may indirectly determine which portion of the source code of the control units 405 is measured. In case an attack detection flag is active, a sequence ID enforcing the hashing of the entire source code for all ECUs may be selected when the device boots. In case the flag is inactive, a random row in the table may be selected.

At 430, the secure storage device 410 may identify a portion of the source code of a software image of the control units 405 to measure. In some examples, at 430, the secure storage device 410 may communicate with the control units 405 to measure the portion of the portion of the software image (e.g., the portion of the source code of the software image). The portion of the software image identified (measured) may be based on the selected sequence ID (e.g., at 425) and based on entries of the pattern sequences table and/or control unit patterns table.

At 440, the secure storage device 410 may receive the portion of the software image 435 from the control units 405. As described herein, the portion of the software image 435 may include portions of the source code of the software image stored to the control units 405. The portion of the source code received by the secure storage device 410 may include a subset of the entire source code of the software image and may be received (e.g., at 440) based on generating the selecting the pattern ID (e.g., at 425) and/or identifying the portion of the software image (e.g., at 430).

At 445, the secure storage device 410 may optionally generate a second hash (e.g., a golden hash) using a copy of the software image stored to the secure storage device 410. In some examples, this may be referred to as dynamically generating a second hash of a copy of the software image stored to the secure storage device 410. The second hash may be generated by measuring a portion of the copy of the software image stored to the secure storage device 410 that is the same as the measured portion of the software image stored to the control units 405. For example, portion of the copy of the software image stored to the secure storage device 410 may be measured based on the selected sequence ID (e.g., at 425) and based on entries of the pattern sequences table and/or control unit patterns table. The second hash may be stored (e.g., temporarily stored) as an entry in the pattern sequences table.

At 450, the secure storage device 410 may generate a first hash associated with the received portion of the software images for the control units 405 (e.g., at 440). The generated first hash may be a cryptographic hash and may be used to authenticate (or not authenticate) the software image of the control units 405. In some examples, the generated hash may be temporarily stored at the secure storage device 410 until the authentication process is complete.

At 455, the secure storage device 410 may identify a second hash for use in authenticating the software image of the control units 405. In some examples, one or more second hashes may be stored in the pattern sequences table. For example, the second hashes may be associated with a respective sequence ID. Accordingly, when a sequence ID is selected (e.g., at 425), the corresponding sequence ID may be associated with a second hash. Accordingly, the secure storage device 410 may identify the second hash based on the sequence ID selected (e.g., at 425).

At 460, the secure storage device 410 may authenticate (or not authenticate) the software image of the control units 405. The secure storage device may compare the first hash (e.g., the hash generated based on receiving the portion of the software image from the control units 405) to the second hash (e.g., the golden hash generated using a portion of the copy of the software image stored to the secure storage device 410). The software image of the control units 405 may be authenticated if the first hash and second hash match, and my not be authenticated if the first hash and second hash do not match.

At 465, the secure storage device 410 may generate a message 470 indicating whether the software image of the control units 405 was authenticated. If authenticated, the message 470 may indicate to the control units 405 that it is safe to boot (e.g., to execute the software image). In case an attack detection flag was raised, the secure storage device 410 may remove the flag so that subsequent boot sequences may be conducted normally. If not authenticated, the same attack detection flag may be raised and the message may instruct the control units 405 to refrain from booting (e.g., to refrain from executing the software image), may prompt an error message to be displayed on one or more components of the associated computing system, and/or may include a copy of the software image stored at the secure storage device 410 to be loaded at the control units 405. The message 470 may be transmitted to the control units 405 (or other component of the associated computing system (not shown)).

At 475, the control units 405 may receive the message. At 480, the control units 405 may optionally execute the stored software image. For example, when the software image of the control units 405 is authenticated, the software image may be executed. In other examples (not shown), at 480 the control units 405 may refrain from executing the software image and/or may download a copy of the source code of the software image stored to the secure storage device 410 that was transmitted in the message 470.

Figure 5:
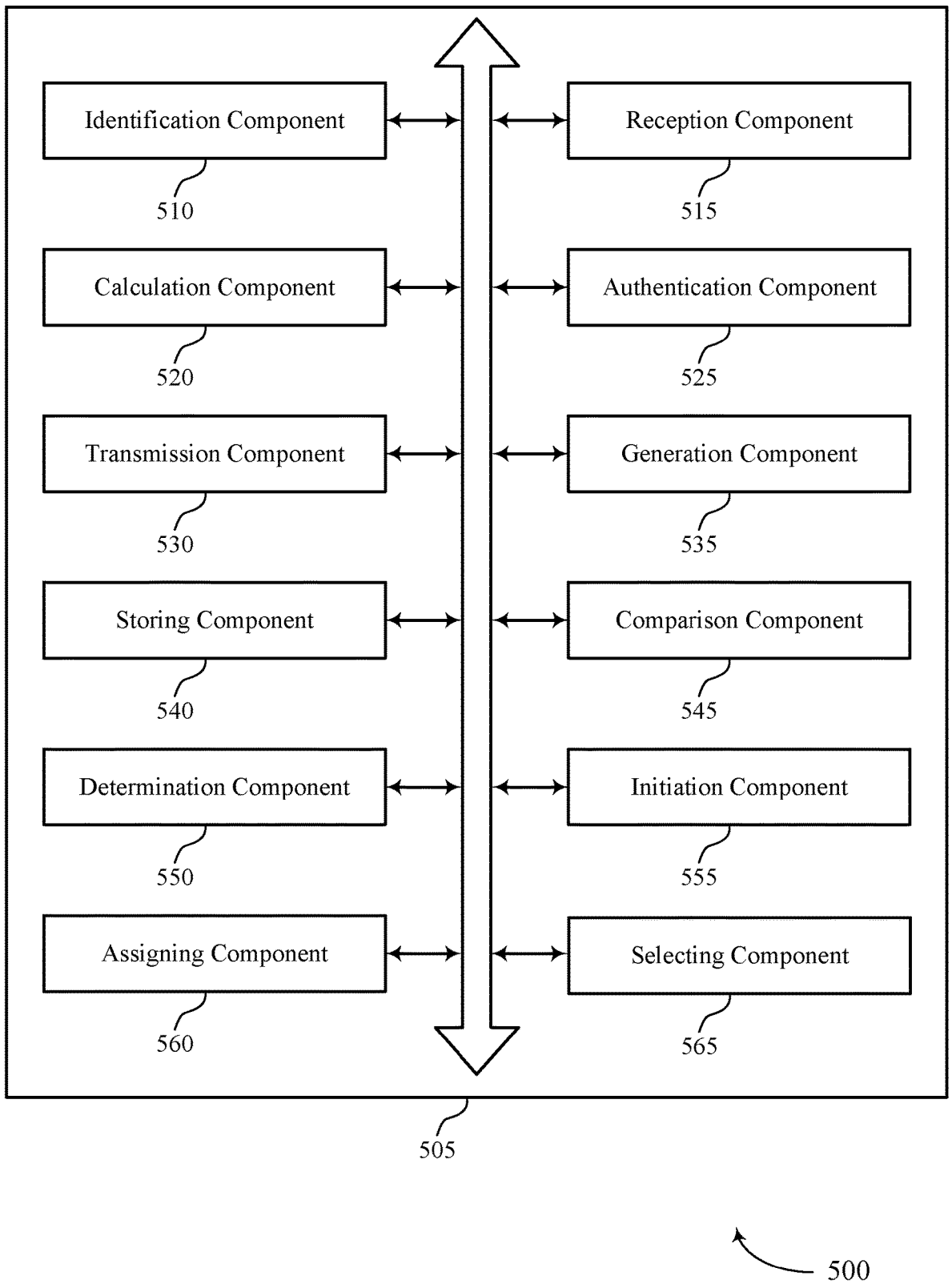
FIG. 5 shows a block diagram of a secure storage device that supports authenticating software images in accordance with examples as disclosed herein.

FIG. 5 shows a block diagram 500 of a secure storage device 505 that supports authenticating software images in accordance with examples as disclosed herein. The secure storage device 505 may be an example of aspects of a secure storage device as described with reference to FIGS. 1 through 4. The secure storage device 505 may include an identification component 510, a reception component 515, a calculation component 520, an authentication component 525, a transmission component 530, a generation component 535, a storing component 540, a comparison component 545, a determination component 550, an initiation component 555, and an assigning component 560. Each of these modules may communicate, directly or indirectly, with one another (e.g., via one or more buses). In some examples, each of the components may be implemented on a secure device's controller, such as the controller 310 as described with reference to FIG. 3. In other examples, some or all of the components may be implemented in software running on an external processor, such as a processor 117 as described with reference to FIG. 1.

The identification component 510 may identify, by a secure storage device, a portion of a software image associated with an electronic control unit to authenticate using the secure storage device. In some examples, the identification component 510 may identify, by the secure storage device, a second hash stored by the secure storage device and associated with the portion of the software image of the electronic control unit based on calculating the first hash. In some examples, the identification component 510 may identify the second hash stored by the secure storage device based on the identified portion of the software image.

In some examples, the identification component 510 may identify a quantity of portions of the software image associated with the electronic control unit based on receiving the diagnostic information, where each of the portions of the software image are associated with a different pattern identifier. In some examples, the identification component 510 may identify, by the secure storage device, a portion of one or more software images that are each associated with additional electronic control units configured to boot on a same system to authenticate using the secure storage device.

In some examples, the identification component 510 may identify, by the secure storage device, respective second hashes stored by the secure storage device and associated with the respective portions of the software images of the set of additional electronic control units based on generating the respective third hashes. In some examples, the identification component 510 may a flag indicating that a third hash did not match before calculating the first hash.

The reception component 515 may receive, by the secure storage device, data associated with the portion of the software image from the electronic control unit based on identifying the portion to authenticate. In some examples, the reception component 515 may receive the portion of the second software image from the electronic control unit.

In some examples, the reception component 515 may receive, by the secure storage device, diagnostic information associated with the electronic control unit before identifying the portion of the software image. In some examples, the reception component 515 may receive, by the secure storage device, data associated with the portions of the software images from a set of additional embedded systems electronic control units based on identifying the portions to authenticate.

The calculation component 520 may calculate, by the secure storage device, a first hash associated with the data received from the electronic control unit. In some examples, the calculation component 520 may calculate, by the secure storage device, the second hash using the portion of a second software image associated with the electronic control unit.

The authentication component 525 may authenticate, by the secure storage device, the software image associated with the electronic control unit based on the first hash matching the second hash. In some examples, the authentication component 525 may refrain from authenticating the software image based on determining that the first hash is different than the second hash. In some examples, the authentication component 525 may authenticate, by the secure storage device, the software images associated with the set of additional electronic control units based on the third hashes matching the second hashes.

The transmission component 530 may transmit, to the electronic control unit, an indication of the authentication. In some examples, the transmission component 530 may transmit, to the electronic control unit, a second indication that the software image associated with the electronic control unit is not authenticated based on refraining from authenticating the software image received from the electronic control unit.

In some examples, the transmission component 530 may transmit, to the electronic control unit, a copy of a second software image stored by the secure storage device based on refraining from authenticating the software image received from the electronic control unit. In some examples, the transmission component 530 may transmit, to the set of additional electronic control units, an indication of the respective authentication.

The generation component 535 may generate a set of second hashes associated with a set of portions of the software image of the electronic control unit, each second hash of the set of second hashes corresponding to one portion of the set of portions of the software image. In some examples, the generation component 535 may generate a random value corresponding an entry in the second table, where identifying the portion of the software image to authenticate is based on the random value. In some examples, the generation component 535 may generate, by the secure storage device, a respective third hash associated with the data received from each of the set of additional electronic control units.

The storing component 540 may store, by the secure storage device, the set of second hashes based on generating the set of second hashes, where identifying the second hash is based on storing the set of second hashes.

The comparison component 545 may compare the first hash with the second hash based on identifying the second hash.

The determination component 550 may determine whether the first hash is different than the second hash based at least on comparing the first hash with the second hash, where authenticating the software image is based on the first hash matching the second hash.

The initiation component 555 may initiate a boot sequence of the electronic control unit, where identifying the portion of the software image of the electronic control unit to authenticate is based on initiating the boot sequence. In some examples, the initiation component 555 may initiate a boot sequence of one or more of a set of additional electronic control units.

The assigning component 560 may assign one or more address ranges of the software image to each of the portions of the software image based on identifying the quantity of portions of the software image. In some examples, the assigning component 560 may assign the quantity of portions of the software image, the pattern identifier associated with each of the quantity of portions of the software image, and the one or more assigned address ranges to respective entries in a first table stored at the secure storage device based on assigning the one or more address ranges of the software image to each of the portions of the software image.

In some examples, the assigning component 560 may assign an integer value to each of the respective second hashes based on assigning the respective entries in the first table. In some examples, the assigning component 560 may assign the generated second hashes and associated pattern identifiers to respective entries in a second table stored at the secure storage device based on assigning the integer value to each of the generated second hashes.

In some examples, the selecting component 565 may select a first entry in the second table stored at the secure storage device based at least in part on identifying the flag, where the entire software image is to be authenticated based on selecting the first entry in the second table.

Figure 6:
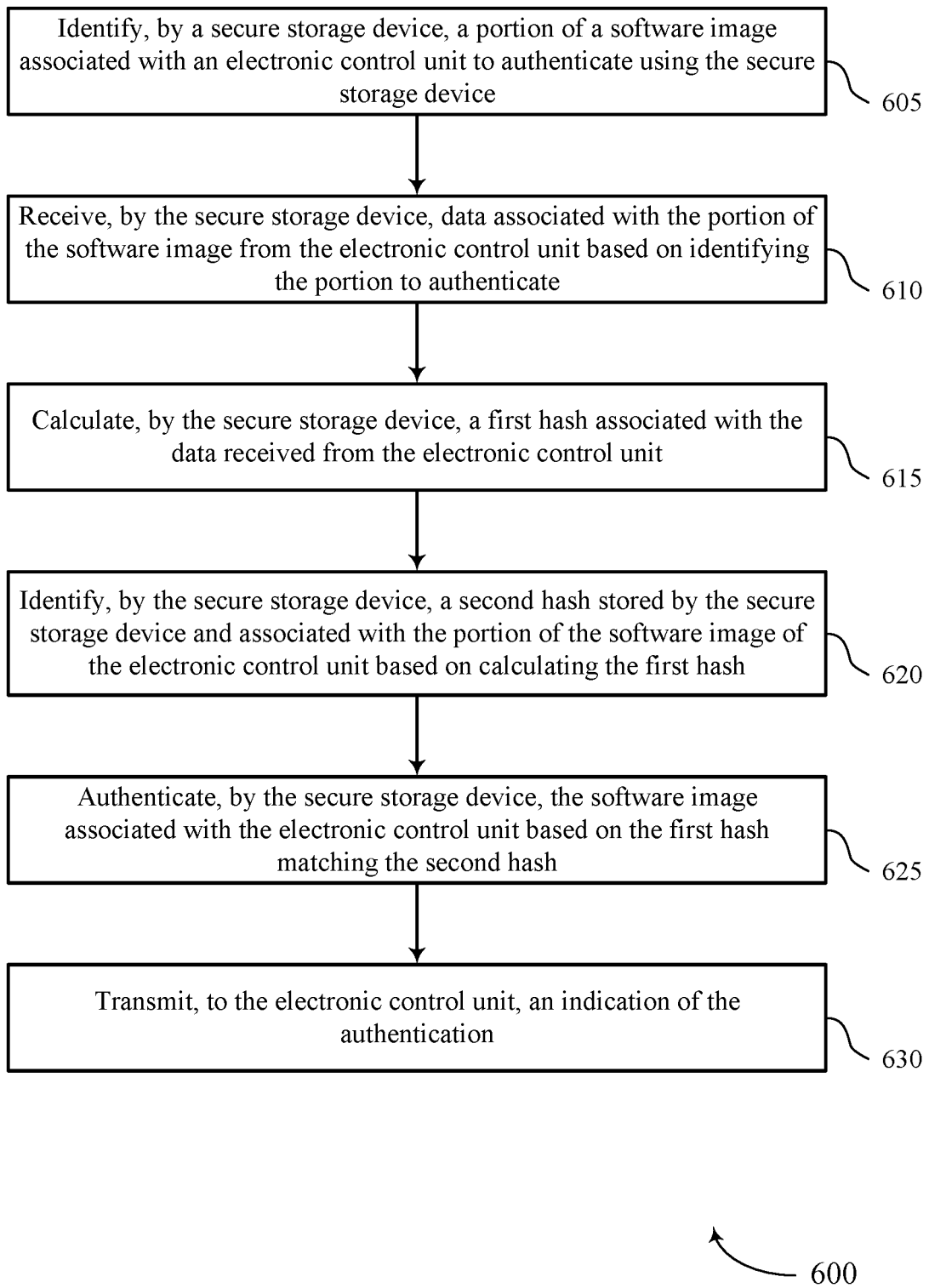
FIG. 6 shows a flowchart illustrating a method or methods that support authenticating software images in accordance with examples as disclosed herein.

FIG. 6 shows a flowchart illustrating a method or methods 600 that supports authenticating software images in accordance with examples as disclosed herein. The operations of method 600 may be implemented by a secure storage device or its components as described herein. For example, the operations of method 600 may be performed by a secure storage device as described with reference to FIG. 5. In some examples, a secure storage device may execute a set of instructions to control the functional elements of the secure storage device to perform the described functions. Additionally or alternatively, a secure storage device may perform aspects of the described functions using special-purpose hardware.

At 605, the secure storage device may identify, by a secure storage device, a portion of a software image associated with an electronic control unit to authenticate using the secure storage device. The operations of 605 may be performed according to the methods described herein. In some examples, aspects of the operations of 605 may be performed by an identification component as described with reference to FIG. 5.

At 610, the secure storage device may receive, by the secure storage device, data associated with the portion of the software image from the electronic control unit based on identifying the portion to authenticate. The operations of 610 may be performed according to the methods described herein. In some examples, aspects of the operations of 610 may be performed by a reception component as described with reference to FIG. 5.

At 615, the secure storage device may calculate, by the secure storage device, a first hash associated with the data received from the electronic control unit. The operations of 615 may be performed according to the methods described herein. In some examples, aspects of the operations of 615 may be performed by a calculation component as described with reference to FIG. 5.

At 620, the secure storage device may identify, by the secure storage device, a second hash stored by the secure storage device and associated with the portion of the software image of the electronic control unit based on calculating the first hash. The operations of 620 may be performed according to the methods described herein. In some examples, aspects of the operations of 620 may be performed by an identification component as described with reference to FIG. 5.

At 625, the secure storage device may authenticate, by the secure storage device, the software image associated with the electronic control unit based on the first hash matching the second hash. The operations of 625 may be performed according to the methods described herein. In some examples, aspects of the operations of 625 may be performed by an authentication component as described with reference to FIG. 5.

At 630, the secure storage device may transmit, to the electronic control unit, an indication of the authentication. The operations of 630 may be performed according to the methods described herein. In some examples, aspects of the operations of 630 may be performed by a transmission component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for identifying, by a secure storage device, a portion of a software image associated with an electronic control unit to authenticate using the secure storage device, receiving, by the secure storage device, data associated with the portion of the software image from the electronic control unit based on identifying the portion to authenticate, calculating, by the secure storage device, a first hash associated with the data received from the electronic control unit, identifying, by the secure storage device, a second hash stored by the secure storage device and associated with the portion of the software image of the electronic control unit based on calculating the first hash, authenticating, by the secure storage device, the software image associated with the electronic control unit based on the first hash matching the second hash, and transmitting, to the electronic control unit, an indication of the authentication.

In some examples of the method 600 and the apparatus described herein, identifying the second hash may include operations, features, means, or instructions for identifying the second hash stored by the secure storage device based on the identified portion of the software image.

Some examples of the method 600 and the apparatus described herein may further include operations, features, means, or instructions for generating a set of second hashes associated with a set of portions of the software image of the electronic control unit, each second hash of the set of second hashes corresponding to one portion of the set of portions of the software image, and storing, by the secure storage device, the set of second hashes based on generating the set of second hashes, where identifying the second hash may be based on storing the set of second hashes.

In some examples of the method 600 and the apparatus described herein, identifying the second hash may include operations, features, means, or instructions for calculating, by the secure storage device, the second hash using the portion of a second software image associated with the electronic control unit.

Some examples of the method 600 and the apparatus described herein may further include operations, features, means, or instructions for receiving the portion of the second software image from the electronic control unit.

Some examples of the method 600 and the apparatus described herein may further include operations, features, means, or instructions for comparing the first hash with the second hash based on identifying the second hash, and determining whether the first hash may be different than the second hash based at least on comparing the first hash with the second hash, where authenticating the software image may be based on the first hash matching the second hash.

Some examples of the method 600 and the apparatus described herein may further include operations, features, means, or instructions for refraining from authenticating the software image based on determining that the first hash may be different than the second hash, and transmitting, to the electronic control unit, a second indication that the software image associated with the electronic control unit may be not authenticated based on refraining from authenticating the software image received from the electronic control unit.

Some examples of the method 600 and the apparatus described herein may further include operations, features, means, or instructions for transmitting, to the electronic control unit, a copy of a second software image stored by the secure storage device based on refraining from authenticating the software image received from the electronic control unit.

Some examples of the method 600 and the apparatus described herein may further include operations, features, means, or instructions for initiating a boot sequence of the electronic control unit, where identifying the portion of the software image of the electronic control unit to authenticate may be based on initiating the boot sequence.

Some examples of the method 600 and the apparatus described herein may further include operations, features, means, or instructions for receiving, by the secure storage device, diagnostic information associated with the electronic control unit before identifying the portion of the software image, identifying a quantity of portions of the software image associated with the electronic control unit based on receiving the diagnostic information, where each of the portions of the software image may be associated with a different pattern identifier, and assigning one or more address ranges of the software image to each of the portions of the software image based on identifying the quantity of portions of the software image.

Some examples of the method 600 and the apparatus described herein may further include operations, features, means, or instructions for assigning the quantity of portions of the software image, the pattern identifier associated with each of the quantity of portions of the software image, and the one or more assigned address ranges to respective entries in a first table stored at the secure storage device based on assigning the one or more address ranges of the software image to each of the portions of the software image.

Some examples of the method 600 and the apparatus described herein may further include operations, features, means, or instructions for assigning an integer value to each of the respective second hashes based on assigning the respective entries in the first table.

Some examples of the method 600 and the apparatus described herein may further include operations, features, means, or instructions for assigning the generated second hashes and associated pattern identifiers to respective entries in a second table stored at the secure storage device based on assigning the integer value to each of the generated second hashes.

Some examples of the method 600 and the apparatus described herein may further include operations, features, means, or instructions for generating a random value corresponding an entry in the second table, where identifying the portion of the software image to authenticate may be based on the random value.

In some examples of the method 600 and the apparatus described herein, the second table includes a set of pattern identifiers for portions of a set of software images of a set of electronic control units and a set of hashes associated with each of the portions of the software image.

Some examples of the method 600 and the apparatus described herein may further include operations, features, means, or instructions for identifying a flag indicating that a third hash did not match before calculating the first hash and selecting a first entry in the second table stored at the secure storage device based at least in part on identifying the flag, where the entire software image is to be authenticated based on selecting the first entry in the second table.

In some examples of the method 600 and the apparatus described herein, the secure storage device includes a circuit that may be inaccessible to the electronic control unit.

Some examples of the method 600 and the apparatus described herein may further include operations, features, means, or instructions for initiating a boot sequence of one or more of a set of additional electronic control units, identifying, by the secure storage device, a portion of one or more software images that may be each associated with additional electronic control units configured to boot on a same system to authenticate using the secure storage device, receiving, by the secure storage device, data associated with the portions of the software images from a set of additional embedded systems electronic control units based on identifying the portions to authenticate, generating, by the secure storage device, a respective third hash associated with the data received from each of the set of additional electronic control units, identifying, by the secure storage device, respective second hashes stored by the secure storage device and associated with the respective portions of the software images of the set of additional electronic control units based on generating the respective third hashes, authenticating, by the secure storage device, the software images associated with the set of additional electronic control units based on the third hashes matching the second hashes, and transmitting, to the set of additional electronic control units, an indication of the respective authentication.

In some examples of the method 600 and the apparatus described herein, the secure storage device may be configured to authenticate software images associated with a set of electronic control units within a system.

It should be noted that the methods described herein are possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   initiating a boot sequence of a plurality of electronic control units configured to boot on a same system;
   identifying, by a secure storage device and for the plurality of electronic control units, a portion of a software image associated with a respective electronic control unit of the plurality of electronic control units to authenticate using the secure storage device based at least in part on initiating the boot sequence;
   receiving, by the secure storage device, first data associated with a first portion of a first software image from a first electronic control unit of the plurality of electronic control units and second data associated with a second portion of a second software image from a second electronic control unit of the plurality of electronic control units based at least in part on the identifying;

generating, by the secure storage device, a first hash associated with the first data received from the first electronic control unit and a second hash associated with the second data received from the second electronic control unit;

identifying, by the secure storage device, a third hash stored by the secure storage device and associated with the first portion of the first software image of the first electronic control unit and a fourth hash stored by the secure storage device and associated with the second portion of the second software image of the second electronic control unit based at least in part on the generating;

authenticating, by the secure storage device, the first software image associated with the first electronic control unit based at least in part on the first hash matching the third hash and the second software image associated with the second electronic control unit based at least in part on the second hash matching the fourth hash; and transmitting a first indication of the authenticating the first software image to the first electronic control unit and a second indication of the authenticating the second software image to the second electronic control unit.

2. The method of claim 1, wherein identifying the third hash comprises:

identifying the third hash stored by the secure storage device based at least in part on the first portion of the first software image.

3. The method of claim 2, further comprising:

generating a plurality of third hashes associated with a plurality of portions of the first software image of the first electronic control unit, each third hash of the plurality of third hashes corresponding to one portion of the plurality of portions of the first software image; and storing, by the secure storage device, the plurality of third hashes based at least in part on generating the plurality of third hashes, wherein identifying the third hash is based at least in part on storing the plurality of third hashes.

4. The method of claim 1, wherein identifying the third hash comprises:

generating, by the secure storage device, the third hash using a third portion of a third software image associated with the first electronic control unit.

5. The method of claim 4, further comprising:

receiving the third portion of the third software image from the first electronic control unit.

6. The method of claim 1, further comprising:

comparing the first hash with the third hash based at least in part on identifying the third hash; and determining whether the first hash is different than the third hash based at least on comparing the first hash with the third hash, wherein authenticating the first software image is based at least in part on the first hash matching the third hash.

7. The method of claim 6, further comprising:

refraining from authenticating a third software image received from the first electronic control unit based at least in part on determining that a fifth hash is different than a sixth hash associated with the third software image; and transmitting, to the first electronic control unit, a third indication that the third software image associated with the first electronic control unit is not authenticated based at least in part on refraining from authenticating the third software image received from the first electronic control unit.

8. The method of claim 7, further comprising:

transmitting, to the first electronic control unit, a copy of the first software image stored by the secure storage device based at least in part on refraining from authenticating the third software image received from the first electronic control unit.

9. The method of claim 1, further comprising:

receiving, by the secure storage device, diagnostic information associated with the first electronic control unit before identifying the first portion of the first software image;

identifying a quantity of a plurality of portions of the first software image associated with the first electronic control unit based at least in part on receiving the diagnostic information, wherein each of the plurality of portions of the first software image is associated with a different pattern identifier; and assigning one or more address ranges of the first software image to each of the plurality of portions of the first software image based at least in part on identifying the quantity of the plurality of portions of the first software image.

10. The method of claim 9, further comprising:

assigning the quantity of the plurality of portions of the first software image, a respective pattern identifier associated with each of the quantity of the plurality of portions of the first software image, and the one or more assigned address ranges to respective entries in a first table stored at the secure storage device based at least in part on assigning the one or more address ranges of the first software image to each of the plurality of portions of the first software image.

11. The method of claim 10, wherein a respective third hash is associated with each of the one or more assigned address ranges, the method further comprising:

assigning an integer value to each of the respective third hashes based at least in part on assigning the respective entries in the first table.

12. A method, comprising:

receiving, by a secure storage device, diagnostic information associated with an electronic control unit;

identifying a quantity of a plurality of portions of a software image associated with the electronic control unit based at least in part on receiving the diagnostic information, wherein each of the plurality of portions of the software image is associated with a different pattern identifier;

assigning one or more address ranges of the software image to each of the plurality of portions of the software image based at least in part on identifying the quantity of the plurality of portions of the software image, wherein a respective first hash is associated with each of the one or more assigned address ranges;

assigning the quantity of the plurality of portions of the software image, a respective pattern identifier associated with each of the quantity of the plurality of portions of the software image, and the one or more assigned address ranges to respective entries in a first table stored at the secure storage device based at least in part on assigning the one or more address ranges of the software image to each of the plurality of portions of the software image;

assigning an integer value to each of the respective first hashes based at least in part on assigning the respective entries in the first table;

assigning the respective first hashes and associated pattern identifiers to respective entries in a second table stored at the secure storage device based at least in part on assigning the integer value to each of the respective first hashes;

identifying, by the secure storage device, a first portion of the software image associated with the electronic control unit to authenticate using the secure storage device;

receiving, by the secure storage device, data associated with the first portion of the software image from the electronic control unit based at least in part on identifying the first portion to authenticate;

calculating, by the secure storage device, a second hash associated with the data received from the electronic control unit;

identifying, by the secure storage device, a first hash stored by the secure storage device and associated with the first portion of the software image of the electronic control unit based at least in part on calculating the second hash;

authenticating, by the secure storage device, the software image associated with the electronic control unit based at least in part on the second hash matching the first hash; and transmitting, to the electronic control unit, an indication of the authentication.

13. The method of claim 12, further comprising:
generating a random value corresponding to an entry in the second table, wherein identifying the first portion of the software image to authenticate is based at least in part on the random value.

14. The method of claim 12, wherein the second table comprises:
a plurality of pattern identifiers for portions of a plurality of software images of a plurality of electronic control units; and
a plurality of hashes associated with each of the plurality of portions of the software image.

15. The method of claim 12, further comprising:
identifying a flag indicating that a third hash did not match before calculating the second hash; and
selecting a first entry in the second table stored at the secure storage device based at least in part on identifying the flag, wherein an entirety of the software image is to be authenticated based on selecting the first entry in the second table.

16. The method of claim 1, wherein the secure storage device is configured to authenticate software images associated with the plurality of electronic control units within the same system.

17. A system, comprising:
a plurality of electronic control units for storing data associated with one or more software images; and
a secure storage device coupled with the plurality of electronic control units and configured to:
initiate a boot sequence of the plurality of electronic control units configured to boot on the system;
identify a portion of a software image associated with a respective electronic control unit of the plurality of electronic control units to authenticate based at least in part on the boot sequence;
receive first data associated with a first portion of a first software image from a first electronic control unit of the plurality of electronic control units and second data associated with a second portion of a second software image from a second electronic control unit of the plurality of electronic control units based at least in part on the identifying;
generate a first hash associated with the first data received from the first electronic control unit and a second hash associated with the second data received from the second electronic control unit;
identify a third hash stored by the secure storage device and associated with the first portion of the first software image of the first electronic control unit and a fourth hash stored by the secure storage device and associated with the second portion of the second software image of the second electronic control unit based at least in part on the generating;
authenticate the first software image associated with the first electronic control unit based at least in part on the first hash matching the third hash and the second software image associated with the second electronic control unit based at least in part on the second hash matching the fourth hash; and
transmit a first indication of the authenticating the first software image to the first electronic control unit and a second indication of the authenticating the second software image to the second electronic control unit.

18. The system of claim 17, wherein the secure storage device is configured to:
identify the third hash based at least in part on the first portion of the first software image;
generate a plurality of third hashes associated with a plurality of portions of the first software image of the first electronic control unit, each third hash of the plurality of third hashes corresponding to one portion of the plurality of portions of the first software image; and
store the plurality of third hashes based at least in part on generating the plurality of third hashes, wherein identifying the third hash is based at least in part on storing the plurality of third hashes.

19. The system of claim 17, wherein the secure storage device is configured to:
generate the third hash using a third portion of a third software image associated with the first electronic control unit;
receive the third software image from the first electronic control unit; and
store a copy of the third software image.

20. A non-transitory computer-readable medium storing computer-executable code, the code executable by a processor to:
initiate a boot sequence of a plurality of electronic control units configured to boot on a same system;
identify a portion of a software image associated with a respective electronic control unit of the plurality of electronic control units to authenticate using a secure storage device based at least in part on the boot sequence;
receive first data associated with a first portion of a first software image from a first electronic control unit of the plurality of electronic control units and second data associated with a second portion of a second software image from a second electronic control unit of the plurality of electronic control units based at least in part on the identifying;

generate a first hash associated with the first data received from the first electronic control unit and a second hash associated with the second data received from the second electronic control unit;

identify a third hash stored by the secure storage device and associated with the first portion of the first software image of the first electronic control unit and a fourth hash stored by the secure storage device and associated with the second portion of the second software image of the second electronic control unit based at least in part on the generating;

authenticate the first software image associated with the first electronic control unit based at least in part on the first hash matching the third hash and the second software image associated with the second electronic control unit based at least in part on the second hash matching the fourth hash; and transmit a first indication of the authenticating the first software image to the first electronic control unit and a second indication of the authenticating the second software image to the second electronic control unit.

21. The non-transitory computer-readable medium of claim 20, wherein the code is executable by the processor to:

generate a plurality of third hashes associated with a plurality of portions of the first software image of the first electronic control unit, each third hash of the plurality of third hashes corresponding to one portion of the plurality of portions of the first software image; and store the plurality of third hashes based at least in part on generating the plurality of third hashes.

22. The non-transitory computer-readable medium of claim 20, wherein the code is executable by the processor to:

compare the first hash with the third hash based at least in part on identifying the third hash; and determine whether the first hash is different than the third hash based at least on comparing the first hash with the third hash, wherein authenticating the first software image is based at least in part on the first hash matching the third hash.

* * * * *